United States Patent
Tomida

(10) Patent No.: US 11,757,620 B2
(45) Date of Patent: Sep. 12, 2023

(54) CIPHER SYSTEM, ENCRYPTION APPARATUS, DECRYPTION APPARATUS, CIPHER METHOD, ENCRYPTION METHOD, DECRYPTION METHOD AND PROGRAM

(71) Applicant: NIPPON TELEGRAPH AND TELEPHONE CORPORATION, Tokyo (JP)

(72) Inventor: Junichi Tomida, Musashino (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 268 days.

(21) Appl. No.: 17/284,907

(22) PCT Filed: Nov. 18, 2019

(86) PCT No.: PCT/JP2019/045088
§ 371 (c)(1),
(2) Date: Apr. 13, 2021

(87) PCT Pub. No.: WO2020/110800
PCT Pub. Date: Jun. 4, 2020

(65) Prior Publication Data
US 2022/0140998 A1 May 5, 2022

(30) Foreign Application Priority Data
Nov. 29, 2018 (JP) .................. 2018-223911

(51) Int. Cl.
*H04L 9/06* (2006.01)
*H04L 9/08* (2006.01)
(Continued)

(52) U.S. Cl.
CPC ........ *H04L 9/0618* (2013.01); *H04L 2209/16* (2013.01)

(58) Field of Classification Search
CPC ....... H04L 9/0618; H04L 9/0825; H04L 9/14; H04L 9/3066; H04L 2209/16
See application file for complete search history.

(56) References Cited

U.S. PATENT DOCUMENTS

| | | | | |
|---|---|---|---|---|
| 2013/0114815 A1* | 5/2013 | Nishimaki | ............ | H04L 9/3073 380/278 |
| 2015/0010147 A1* | 1/2015 | Takashima | ................ | H04L 9/16 380/44 |
| 2015/0229472 A1* | 8/2015 | Takashima | .............. | H04L 9/007 380/28 |

OTHER PUBLICATIONS

Functional Encryption for Inner Product: Achieving Constant-Size Ciphertexts with Adaptive Security or Support for Negation, by Libert et al., published 2010. (Year: 2010).*

(Continued)

*Primary Examiner* — Vu V Tran
(74) *Attorney, Agent, or Firm* — IPUSA, PLLC

(57) ABSTRACT

An encryption system for performing encryption and decryption by a multi-input inner product functional encryption having a function hiding property includes a setup unit configured to generate, taking a vector length m and the number of arguments μ of an inner product function as input, a master secret key msk and a public parameter pp by using a setup algorithm of a single-input inner product functional encryption having a predetermined characteristic and having a function hiding property and a key generation algorithm of a common key encryption satisfying a predetermined condition, an encryption unit configured to generate, taking the master secret key msk, the public parameter pp, an index i of the arguments, and a vector x as input, a ciphertext $ct_i$ corresponding to the index i by using an encryption algorithm of the single-input inner product functional encryption and an encryption algorithm of the common key encryption.

6 Claims, 4 Drawing Sheets

(51) Int. Cl.
*H04L 9/14* (2006.01)
*H04L 9/30* (2006.01)

(56) References Cited

OTHER PUBLICATIONS

Multi-Input Inner-Product Functional Encryption from Pairings, by Wee et al., published 2017. (Year: 2017).*

M. Abdalla, D. Catalano, D. Fiore, R. Gay, and B. Ursu, "Multi-input functional encryption for inner products: Function-hiding realizations and constructions without pairings", Cryptology ePrint Archive, Report 2017/972, 2017., http://eprint.iacr.org/2017/972.

P. Datta, T. Okamoto, and J. Tomida, "Full-hiding (unbounded) multi-input inner product functional encryption from the k-linear assumption" In M. Abdalla and R. Da-hab, editors, PKC 2018, Part II, vol. 10770 of LNCS, pp. 245-277. Springer, Heidelberg, Mar. 2018.

* cited by examiner

CIPHER SYSTEM, ENCRYPTION APPARATUS, DECRYPTION APPARATUS, CIPHER METHOD, ENCRYPTION METHOD, DECRYPTION METHOD AND PROGRAM

TECHNICAL FIELD

The invention relates to an encryption system, an encryption device, a decryption device, an encryption and decryption method, an encryption method, a decryption method, and a program.

BACKGROUND ART

In a single-input functional encryption (hereinafter, also simply referred to as a "functional encryption"), a function f can be embedded in a key (i.e., a decryption key) for decrypting a ciphertext. When a ciphertext of x is decrypted using the decryption key embedding the function f, a function value f(x) is recovered.

A multi-input functional encryption is an encryption extended from single-input functional encryption, and is a technique of embedding not only a function with a single argument but also a function with two or more arguments in the decryption key. In other words, when there are a ciphertext $ct_1, \ldots, ct_n$ of a value $x_1, \ldots, x_n$ corresponding to an argument $1, \ldots, n$, if the ciphertext $ct_1, \ldots, ct_n$ is decrypted using a secret key $sk_f$ embedding a function f taking the argument $1, \ldots, n$, a function value $f(x_1, \ldots, x_n)$ is recovered. Note that decryption is failed in a case where the ciphertext corresponding to any one of the arguments taken by the function f is not present.

An inner product functional encryption is a functional encryption with the available function f being limited to an inner product, n vectors $y_i, y_n$ are embedded in a decryption key in a multi-input inner product functional encryption, and when n ciphertexts $ct_1, \ldots, ct_n$ encrypted from n vectors $x_1, \ldots, x_n$ are decrypted using the decryption key, a following function value is recovered, $$\sum_{i=1}^{n} \langle x_i, y_i \rangle \quad [\text{Math. 1}]$$

where $\langle \ldots, \ldots \rangle$ denotes the inner product.

Functional encryption characteristics include a function hiding property. The function hiding property is such a characteristic that a decryption key embedding a function hides the function (note that a vector is equivalent to the function in the case of an inner product functional encryption). In other words, the function hiding property is such a characteristic that even a holder of a decryption key embedding a certain function cannot know which type of function the embedded function is.

Conventionally, specific methods for forming a multi-input inner product functional encryption (hereinafter also referred to as a "function-hiding multi-input inner product functional encryption") having the function hiding property have been known (NPLs 1 and 2).

CITATION LIST

Non Patent Literature

NPL 1: M. Abdalla, D. Catalano, D. Fiore, R. Gay, and B. Ursu. Multi-input functional encryption for inner products: Function-hiding realizations and constructions without pairings. Cryptology ePrint Archive, Report 2017/972, 2017. http://eprint.iacr.org/2017/972.

NPL 2: P. Datta, T. Okamoto, and J. Tomida. Full-hiding (unbounded) multi-input inner product functional encryption from the k-linear assumption. In M. Abdalla and R. Da-hab, editors, PKC 2018, Part II, volume 10770 of LNCS, pages 245-277. Springer, Heidelberg, Mar. 2018.

SUMMARY OF THE INVENTION

Technical Problem

However, in general, it is often more difficult to form the multi-input functional encryption than formation of the single-input functional encryption. For this reason, it is assumed that in a case where an attempt is, for example, made to form a more-efficient function-hiding multi-input inner product functional encryption, great effort is necessary for designing and security analysis for the encryption.

The present invention has been made in view of the above-described point, and an object of the present invention is to realize a function-hiding multi-input inner product functional encryption by using a function-hiding inner product functional encryption.

Means for Solving the Problem

To achieve the above-described object, an encryption system in an embodiment of the present invention is an encryption system for performing encryption and decryption by a multi-input inner product functional encryption having a function hiding property, the encryption system including a setup unit configured to generate, taking a vector length m and the number of arguments μ of an inner product function as input, a master secret key msk and a public parameter pp by using a setup algorithm of a single-input inner product functional encryption having a predetermined characteristic and having a function hiding property and a key generation algorithm of a common key encryption satisfying a predetermined condition, an encryption unit configured to generate, taking the master secret key msk, the public parameter pp, an index i of the arguments, and a vector x as input, a ciphertext $ct_i$ corresponding to the index i by using an encryption algorithm of the single-input inner product functional encryption and an encryption algorithm of the common key encryption, a secret key generation unit configured to generate, taking the master secret key msk, the public parameter pp, and μ vectors $y_1, y_\mu$ as input, a secret key sk for decrypting the ciphertext cti by using a key generation algorithm of the single-input inner product functional encryption and the encryption algorithm of the common key encryption, and a decryption unit configured to generate, taking the public parameter pp, the ciphertext $ct_1, \ldots, ct_\mu$, and the secret key sk as input, a decrypted value d of the ciphertext $ct_1, \ldots, ct_\mu$ by using a decryption algorithm of the single-input inner product functional encryption and a decryption algorithm of the common key encryption.

Effects of the Invention

The function-hiding multi-input inner product functional encryption can be implemented using the function-hiding inner product functional encryption.

DESCRIPTION OF EMBODIMENTS

Figure 1:
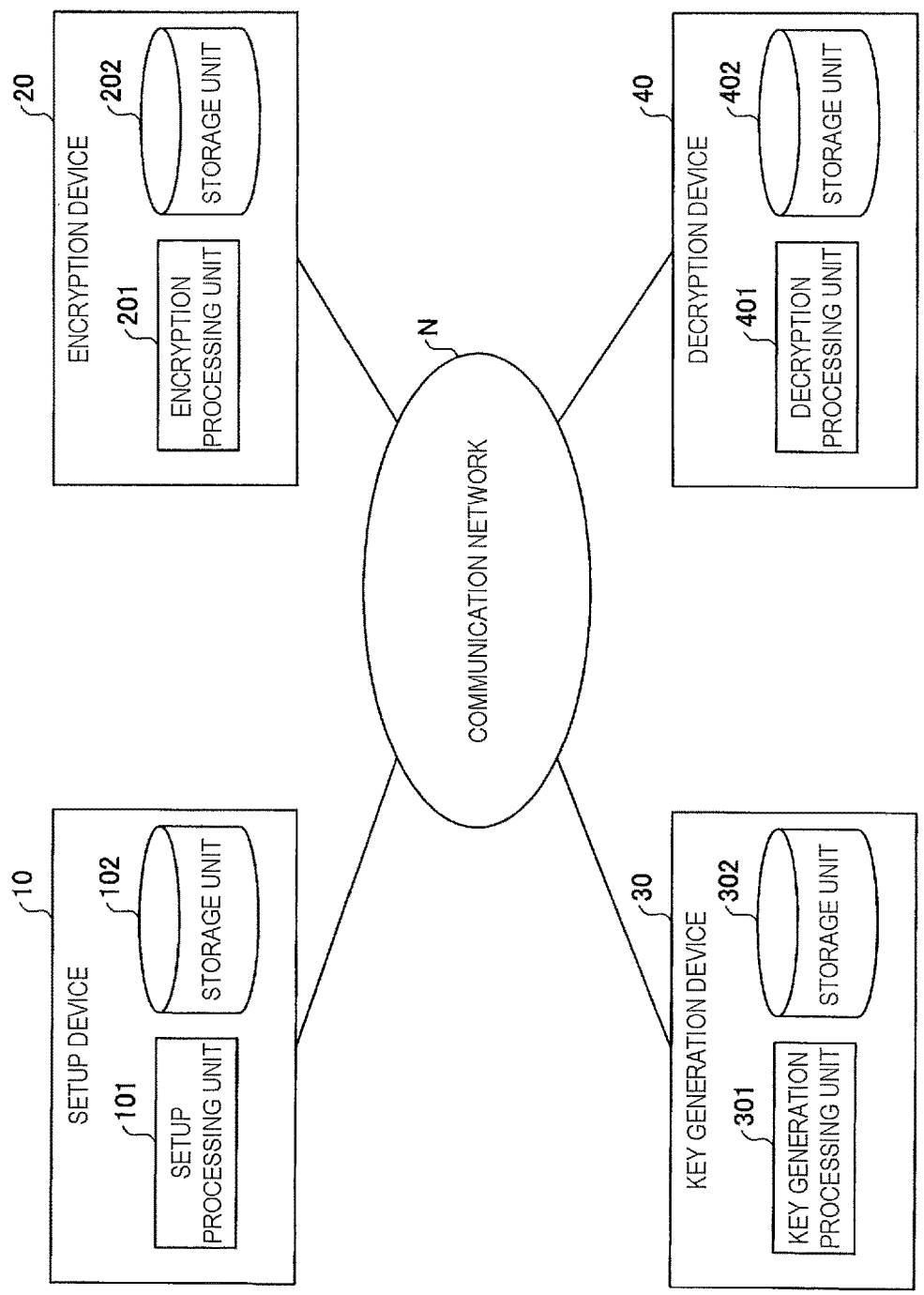
FIG. 1 is a diagram illustrating an example of an overall configuration of an encryption system in an embodiment of the present invention.

An embodiment of the present invention will be described below. In the embodiment of the invention, an encryption system 1 configured to realize a function-hiding multi-input inner product functional encryption by using a function-hiding inner product functional encryption (i.e., a single-input inner product functional encryption having a function hiding property) will be described. In other words, the encryption system 1 in the embodiment of the present invention converts the function-hiding inner product functional encryption into the function-hiding multi-input inner product functional encryption in a versatile manner. With this configuration, in the embodiment of the present invention, it is only required that the function-hiding inner product functional encryption (having predetermined characteristics) is designed for designing the function-hiding multi-input inner product functional encryption, and an effort required for designing the function-hiding multi-input inner product functional encryption can be significantly reduced.

Notations

First, Notations used herein will be Described.

The operation of defining a variable a as b is denoted as a :=b.

A vector is treated as a column vector.

Random selection of an element s from a set S is denoted as following expression:

$$s \overset{U}{\leftarrow} S \quad [\text{Math. 2}]$$

The bit length of b is denoted as |b| for a bit sequence b.

A quotient ring Z/nZ is denoted as $Z_n$ for a natural number n.

A set of natural numbers equal to or less than n is denoted as [n] for the natural number n.

A set including all bit sequences of n bits is denoted as $\{0, 1\}^n$ for the natural number n.

Bilinear groups $G_1$, $G_2$, $G_T$ of an order of a prime p with a bilinear map e: $G_1 \times G_2 \rightarrow G_T$ and the generator $g_1$, $g_2$, $g_t$ thereof will be considered. On this point, with respect to a J×L matrix on i ∈ {1, 2, T} and $Z_p$ expressed as $$M = (m_{j,\ell})_{1 \le j \le J, 1 \le \ell \le L} \quad [\text{Math. 3}]$$

$[M]_i$ is a J×L matrix that has, as its elements group elements defined by the following:

$$g_i^{m_{j,\ell}})_{1 \le j \le J, 1 \le \ell \le L} \quad [\text{Math. 4}]$$

Related Art Used for Conversion into Function-Hiding Multi-Input Inner Product Functional Encryption As related art used in the embodiment of the present invention, the function-hiding inner product functional encryption and a common key encryption will be described.

Function-hiding inner product functional encryption (i.e., Single-Input Inner Product Functional Encryption Having Function Hiding Property)

As the function-hiding inner product functional encryption as a conversion source, a function-hiding inner product functional encryption formed by related art can be used. Here, it is assumed that for the function-hiding inner product functional encryption used in the embodiment of the present invention, an inner product can be calculated on the quotient ring $Z_n$. Note that it is not necessary to output, as a decrypted value, an inner product value on the quotient ring $Z_n$, and any encoded value may be output as long as homomorphic operation of addition can be performed among values.

Some methods for forming the function-hiding inner product functional encryption have been known, but see Reference Literature 1 and Reference Literature 2, for example.

REFERENCE DOCUMENT 1

A. Bishop, A. Jain, and L. Kowalczyk. Function-hiding inner product encryption. In T. Iwata and J. H. Cheon, editors, ASIACRYPT 2015, Part I, volume 9452 of LNCS, pages 470-491. Springer, Heidelberg, November/December 2015.

REFERENCE LITERATURE 2

H. Lin. Indistinguishability obfuscation from SXDH on 5-linear maps and locality-5 PRGs. In J. Katz and H. Shacham, editors, CRYPTO 2017, Part I, volume 10401 of LNCS, pages 599-629. Springer, Heidelberg, August 2017.

These function-hiding inner product functional encryptions are formed using a mathematical structure called a bilinear group.

Hereinafter, a setup algorithm, an encryption algorithm, a key generation algorithm, and a decryption algorithm of the function-hiding inner product functional encryption are denoted as "Setup'", "Enc'", "KeyGen'", and "Dec'", respectively. The order of the quotient ring in calculation of the inner product by the function-hiding inner product functional encryption is n (i.e., the function-hiding inner product functional encryption as the conversion source calculates the inner product on the quotient ring $Z_n$).

Common Key Encryption

It has been known that the common key encryption may include any unidirectional function. Here, the common key encryption used in the embodiment of the present invention satisfies a certain type of indistinguishability (specifically, indistinguishability under chosen-plaintext attack). For example, see Reference Literature 3 below for the indistinguishability under the chosen-plaintext attack.

REFERENCE LITERATURE 3

COSC 530: Lecture Notes on Symmetric-Key Encryption, [online], Internet <URL: http://people.cs.georgetown.edu/~adam/fa5530/cs530-lec4.p df>

Note that in practical use, an advanced encryption standard (AES), Camellia, and the like can be used as the common key encryption, for example.

Hereinafter, a key generation algorithm, an encryption algorithm, and a decryption algorithm of the common key encryption are denoted as "SKE.Gen", "SKE.Enc", and "SKE.Dec", respectively.

Overall Configuration

The encryption system 1 in the embodiment of the present invention forms a setup algorithm Setup, an encryption algorithm Enc, a key generation algorithm KeyGen, and a decryption algorithm Dec of the function-hiding multi-input inner product functional encryption by using Setup', Enc', KeyGen', and Dec' of the above-described function-hiding inner product functional encryption and SKE.Gen, SKE.Enc, and SKE.Dec of the above-described common key encryption. An overall configuration of the encryption system 1 in the embodiment of the present invention will be described with reference to FIG. 1. FIG. 1 is a diagram illustrating an example of the overall configuration of the encryption system 1 in the embodiment of the present invention.

As illustrated in FIG. 1, the encryption system 1 in the embodiment of the present invention includes a setup device 10, an encryption device 20, a key generation device 30, and a decryption device 40. These devices are communicably connected to each other via a communication network N.

The setup device 10 is a computer or a computer system configured to execute the setup algorithm Setup.

The setup device 10 includes a setup processing unit 101 and a storage unit 102. The setup processing unit 101 executes the setup algorithm Setup by using, as input, a vector length m (where m is a natural number) and the number of arguments p (where p is a natural number). In the setup algorithm Setup, a master secret key msk and a public parameter pp are generated and output. In the storage unit 102, various types of information (e.g., the vector length m and the number of arguments p) used in the setup algorithm Setup, an output result (e.g., the master secret key msk and the public parameter pp) of the setup algorithm Setup, and the like are stored. Note that a security parameter $1^\lambda$ may be input to the setup algorithm Setup.

Note that the setup processing unit 101 is implemented by the processing of executing, by an arithmetic device such as a processor, one or more programs installed in the setup device 10, for example. The storage unit 102 can be implemented using various memories (e.g., a main storage device and an auxiliary storage device).

The encryption device 20 is a computer or a computer system configured to execute the encryption algorithm Enc.

The encryption device 20 includes an encryption processing unit 201 and a storage unit 202. The encryption processing unit 201 executes the encryption algorithm Enc by using, as input, the master secret key msk, the public parameter pp, an argument index $i \in [\mu]$, and a vector $x \in Z^m$. In the encryption algorithm Enc, a ciphertext $ct_i$ corresponding to an index i is generated and output. The storage unit 202 stores various types of information (e.g., the master secret key msk, the public parameter pp, the index i, and the vector x) used in the encryption algorithm Enc, an output result (e.g., the ciphertext $ct_i$) of the encryption algorithm Enc, and the like are stored.

Note that the encryption processing unit 201 is implemented by the processing of executing, by an arithmetic device such as a processor, one or more programs installed in the encryption device 20, for example. The storage unit 202 can be implemented using various memories (e.g., a main storage device and an auxiliary storage device).

The key generation device 30 is a computer or a computer system configured to execute the key generation algorithm KeyGen.

The key generation device 30 includes a key generation processing unit 301 and a storage unit 302. The key generation processing unit 301 executes the key generation algorithm KeyGen by using, as input, the master secret key msk, the public parameter pp, and μ vectors $\{y_i\}_{i \in [\mu]}$ (where $y_i \in Z^m$). In the key generation algorithm KeyGen, a secret key sk is generated and output. In the storage unit 302, various types of information (e.g., the master secret key msk, the public parameter pp, and the vectors $\{y_i\}_{i \in [\mu]}$) used in the key generation algorithm KeyGen, an output result (e.g., the secret key sk) of the key generation algorithm KeyGen, and the like are stored.

Note that the key generation processing unit 301 is implemented by the processing of executing, by an arithmetic device such as a processor, one or more programs installed in the key generation device 30, for example. The storage unit 302 can be implemented using various memories (e.g., a main storage device and an auxiliary storage device).

The decryption device 40 is a computer or a computer system configured to execute the decryption algorithm Dec.

The decryption device 40 includes a decryption processing unit 401 and a storage unit 402. The decryption processing unit 401 executes the decryption algorithm Dec by using, as input, the public parameter pp, a ciphertext $\{ct_i\}_{i \in [\mu]}$, and the secret key sk. In the decryption algorithm Dec, a decrypted value d is generated and output. In the storage unit 402, various types of information (e.g., the public parameters pp, the ciphertext $\{ct_i\}_{i \in [\mu]}$, and the secret key sk) used in the decryption algorithm Dec, an output result (e.g., the decrypted value d) of the decryption algorithm Dec, and the like are stored.

Note that the decryption processing unit 401 is implemented by the processing of executing, by an arithmetic device such as a processor, one or more programs installed in the decryption device 40, for example. The storage unit 402 can be implemented using various memories (e.g., a main storage device and an auxiliary storage device).

The configuration of the encryption system 1 illustrated in FIG. 1 is an example, and other configurations may be employed. For example, any two or more devices of the setup device 10, the encryption device 20, and the key generation device 30 maybe configured as a single device. The encryption system 1 may include a plurality of decryption devices 40. Similarly, any one or more devices of the setup device 10, the encryption device 20, and the key generation device 30 may be provided as a plurality of devices.

Figure 2:
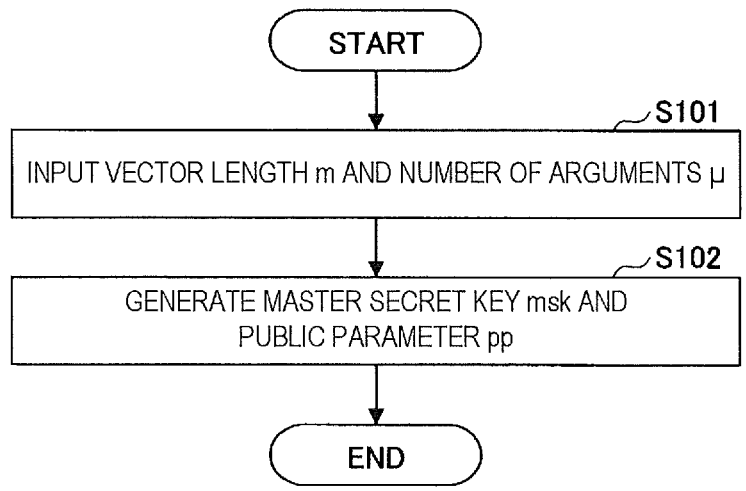
FIG. 2 is a flowchart illustrating an example of processing executed by a setup device in the embodiment of the present invention.

Next, the processing (the processing implemented by the setup algorithm Setup) executed by the setup device 10 will be described with reference to FIG. 2. FIG. 2 is a flowchart illustrating an example of the processing executed by the setup device 10 in the embodiment of the present invention.

First, the setup processing unit 101 inputs the vector length m and the number of arguments p (Step S101). Note that input sources of the vector length m and the number of arguments p are arbitrary, and for example, these values may be input from the storage unit 102, be input from an input device such as a keyboard, or be input from other devices connected via the communication network N.

Next, the setup processing unit 101 generates the master secret key msk and the public parameter pp by the setup algorithm Setup (m, μ) (Step S102).

Here, assuming the following expression, $$(pp'_1, msk_1), \ldots, (pp'_\mu, msk_\mu) \rightarrow \text{Setup}'(2m+1) \qquad [\text{Math. 5}]$$

the setup processing unit 101 generates the public parameter pp according to the following expression.

$$pp := (pp'_1, \ldots, pp'_\mu)$$

The setup processing unit 101 assumes K ☐ SKE.Gen (i.e., the output result of the key generation algorithm SKE.Gen of the common key encryption is K), assumes the following expression, $$K_1, \ldots, K_{\mu-1} \xleftarrow{U} \{0,1\}^{|K|} \qquad [\text{Math. 7}]$$

and obtains the following expression.

$$K_\mu := \bigoplus_{i \in [F-1]} K_i \oplus K \qquad [\text{Math. 8}]$$

Note that the following expression represents an exclusive OR.

$$\oplus \qquad [\text{Math. 9}]$$

Furthermore, the setup processing unit 101 assumes.

$$\{u_i\}_{i \in [\mu]} \xleftarrow{U} Z_n^m \qquad [\text{Math. 10}]$$

and generates the master secret key msk according to the following expression.

$$msk := (K_1, \ldots, K_\mu, K, \{msk'_i\}_{i \in [\mu]}, \{u_i\}_{i \in [\mu]}) \qquad [\text{Math. 11}]$$

The master secret key msk and the public parameter pp are generated as described above. The master secret key msk and the public parameter pp are stored in the storage unit 102, for example. The master secret key msk and the public parameter pp are transmitted to the encryption device 20 and the key generation device 30 via the communication network N, for example.

Encryption

Figure 3:
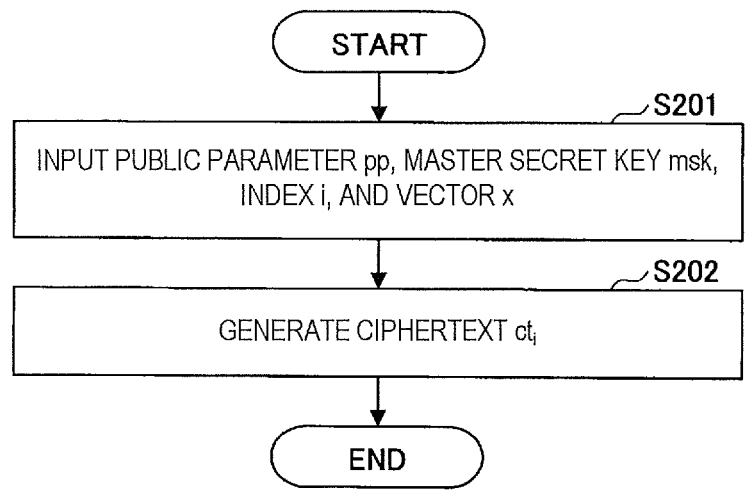
FIG. 3 is a flowchart illustrating an example of processing executed by an encryption device in the embodiment of the present invention.

Next, the processing (the processing implemented by the encryption algorithm Enc) executed by the encryption device 20 will be described with reference to FIG. 3. FIG. 3 is a flowchart illustrating an example of the processing executed by the encryption device 20 in the embodiment of the present invention.

First, the encryption processing unit 201 inputs the master secret key msk, the public parameter pp, the index i ∈[μ], and the vector x ∈ $Z^m$ (Step S201). Note that input sources of the master secret key msk, the public parameter pp, the index i ∈ [μ], and the vector x ∈ $Z^m$ are arbitrary, and for example, these values may be input from the storage unit 202, be input from an input device such as a keyboard, or be input from other devices connected via the communication network N.

Next, the encryption processing unit 201 generates the ciphertext $ct_i$ corresponding to the index i by the encryption algorithm Enc (msk, pp, i, x) (Step S202).

Here, the encryption processing unit 201 assumes $$\tilde{x} := (x+u_i, 0^m, 1) \in Z_n^{2m+1} \qquad [\text{Math. 12}]$$

and obtains the following expression.

$$ct'_i \leftarrow \text{Enc}'(pp'_i, msk'_i, \tilde{x})$$

Note that $0^m$ denotes the zero vector of $Z^m$.

The encryption processing unit 201 generates the ciphertext $ct_i$ corresponding to the index i according to $ct_i := (K_i, C_i)$, assuming the following expression.

$$C_i := \text{SKE.Enc}(K, ct'_i)$$

As described above, the ciphertext $ct_i$ corresponding to the index i is generated. For example, the ciphertext $ct_i$ may be stored in the storage unit 202, or may be transmitted to other devices (e.g., the decryption device 40) via the communication network N.

Key Generation

Figure 4:
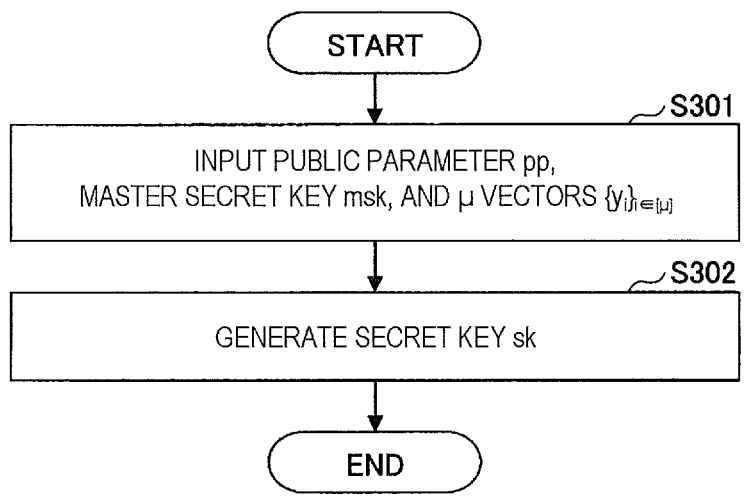
FIG. 4 is a flowchart illustrating an example of processing executed by a key generation device in the embodiment of the present invention.

Next, the processing (the processing implemented by the key generation algorithm KeyGen) executed by the key generation device 30 will be described with reference to FIG. 4. FIG. 4 is a flowchart illustrating an example of the processing executed by the key generation device 30 in the embodiment of the present invention.

First, the key generation processing unit 301 inputs the master secret key msk, the public parameter pp, and the vectors $\{y_i\}_{i \in [\mu]}$ (Step S301). Note that input sources of the master secret key msk, the public parameters pp, and the vectors are arbitrary, and for example, these values maybe input from the storage unit 302, be input from an input device such as a keyboard, or be input from other devices connected via the communication network N.

Next, the key generation processing unit 301 generates the secret key sk by the key generation algorithm KeyGen (msk, pp, $\{y_i\}_{i \in [\mu]}$) (Step S302).

Here, the key generation processing unit 301 assumes $$\{r_i\}_{i \in [\mu-1]} \xleftarrow{U} Z_n \qquad [\text{Math. 15}]$$

$$r_\mu := -\left(\sum_{i \in [\mu-1]} r_i + \sum_{i \in [\mu]} \langle y_i, u_i \rangle\right) \in Z_n \qquad [\text{Math. 16}]$$

and obtains the following expression.

$$\tilde{y}_i := (y_i, 0^m, r_i) \in Z_n^{2m+1} \qquad [\text{Math. 17}]$$

The key generation processing unit 301 assumes $$sk'_i \leftarrow \text{KeyGen}'(pp'_i, msk'_i, \tilde{y}_i) \text{ for all } i \in [\mu] \qquad [\text{Math. 18}]$$

and generates the secret key sk according to the following expression.

$$sk := \text{SKE.Enc}(K, \{sk'_i\}_{i \in [\mu]}) \qquad [\text{Math. 19}]$$

The secret key sk is generated as described above. The secret key sk is transmitted to the decryption device 40 via the communication network N, for example. At this time, the public parameter pp may be transmitted to the decryption device 40 along with the secret key sk.

Figure 5:
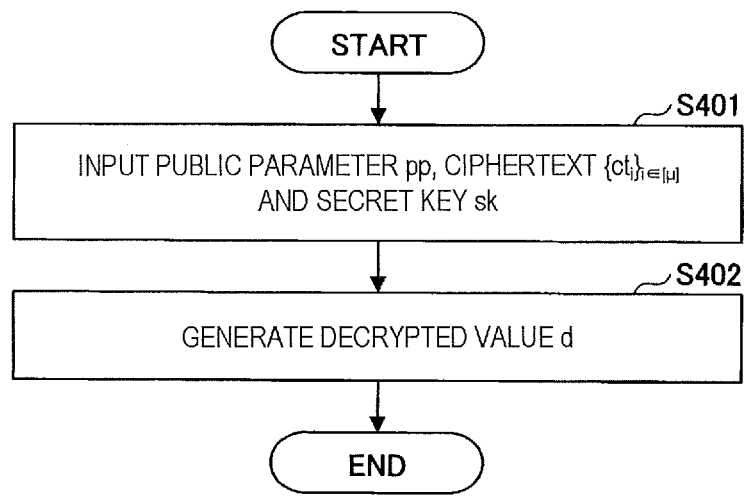
FIG. 5 is a flowchart illustrating an example of processing executed by a decryption device in the embodiment of the present invention.

Decryption Next, the processing (the processing implemented by the decryption algorithm Dec) executed by the decryption device 40 will be described with reference to FIG. 5. FIG. 5 is a flowchart illustrating an example of the processing executed by the decryption device 40 in the embodiment of the present invention.

First, the decryption processing unit 401 inputs the public parameter pp, the ciphertext $\{ct_i\}_{i \in [\mu]}$, and the secret key sk (Step S401). Note that input sources of the public parameter pp, the ciphertext $\{ct_i\}_{i \in [\mu]}$, and the secret key sk are arbitrary, and for example, these values maybe input from the storage unit 402, be input from an input device such as a keyboard, or be input from other devices connected via the communication network N.

Next, the decryption processing unit 401 generates the decrypted value d by the decryption algorithm Dec (pp, $\{ct_i\}_{i \in [\mu]}$, sk) (Step S402).

Here, the decryption processing unit 401 assumes.

$$K := \bigoplus_{i \in [\mu]} K_i \qquad \text{[Math. 20]}$$

and assumes $$\{sk'_i\}_{i \in [\mu]} := \text{SKE.Dec}(K, sk) \qquad \text{[Math. 21]}$$

and obtains the following expression.

$$ct'_i := \text{SKE.Dec}(K, C_i)$$

Next, the decryption processing unit 401 assumes $$d_i := \text{Dec}'(pp'_i, ct'_i, ski'_i) \text{ for all } i \in [\mu] \qquad \text{[Math. 23]}$$

and obtains the following expression.

$$d' := d_1 \circ \ldots \circ d_\mu \qquad \text{[Math. 24]}$$

where $\circ$ is source homomorphic operation on encoded $Z_n$.

The decryption processing unit 401 decodes d'to generate the decrypted value d.

The decrypted value d is generated as described above. For example, the decrypted value d may be stored in the storage unit 402, or may be transmitted to other devices via the communication network N.

EXAMPLES

In each type of processing illustrated in FIGS. 2 to 5 as described above, the case where the function-hiding inner product functional encryption is converted into the function-hiding multi-input inner product functional encryption in a versatile manner by using the common key encryption and the function-hiding inner product functional encryption has been described. In the following examples, specific cases using the function-hiding inner product functional encryption will be described.

In the following examples, a method described in Reference Literature 5 below is applied to an inner product functional encryption (more specifically, a one-SEL-SIM scheme for a single-input inner product) described in Reference Literature 4 below, and therefore, a function-hiding inner product functional encryption configured such that the inner product functional encryption has a function hiding property is used. With this configuration, a more-efficient function-hiding multi-input inner product functional encryption than the function-hiding multi-input inner product functional encryptions described in NPL 1 and NPL 2 can be implemented, for example.

REFERENCE LITERATURE 4

Michel Abdalla, Romain Gay, Mariana Raykova, and Hoeteck Wee. Multi-input inner-product functional encryption from pairings. In Jean-Sebastien Coron and Jesper Buus Nielsen, editors, EUROCRYPT 2017, Part I, volume 10210 of LNCS, pages 601-626. Springer, Heidelberg, April/May 2017.

REFERENCE LITERATURE 5

H. Lin. Indistinguishability obfuscation from SXDH on 5-linear maps and locality-5 PRGs. In J. Katz and H. Shacham, editors, CRYPTO 2017, Part I, volume 10401 of LNCS, pages 599-629. Springer, Heidelberg, August 2017. Note that in the following examples, k may be any natural number. p is a prime number.

Setup in Examples

In Step S101 of FIG. 2, the setup processing unit 101 inputs the vector length m and the number of arguments $\mu$. Then, in Step S102 of FIG. 2, the setup processing unit 101 generates the master secret key msk and the public parameter pp by the setup algorithm Setup (m, $\mu$). At this time, in this example, the master secret key msk and the public parameter pp are generated as follows.

First, the setup processing unit 101 assumes $$A_1, \ldots, A_\mu, B_1, \ldots, B_\mu \overset{U}{\leftarrow} Z_p^{(k+1) \times k} \qquad \text{[Math. 25]}$$

$$W_1, \ldots, W_\mu \overset{U}{\leftarrow} Z_p^{(2m+1) \times (k+1)}$$

$$V_1, \ldots, V_\mu \overset{U}{\leftarrow} Z_p^{(2m+k+2) \times (k+1)}$$

$$u_1, \ldots, u_i \overset{U}{\leftarrow} Z_p^m$$

and obtains K $\square$ SKE.Gen.

Next, the setup processing unit 101 assumes $$K_1, \ldots, K_{\mu-1} \overset{U}{\leftarrow} \{0, 1\}^{|K|} \qquad \text{[Math. 26]}$$

and obtains the following expression.

$$K_\mu := \bigoplus_{i \in [\mu-1]} K_i \oplus K \qquad \text{[Math. 27]}$$

Then, the setup processing unit 101 generates the master secret key msk according to the following expression.

$$\text{msk} := (K, \{K_i, A_i, B_i, W_i, V_i, u_i\}_{i \in [\mu]}) \qquad \text{[Math. 28]}$$

The setup processing unit 101 sets, as the public parameter pp, information specifying the bilinear groups $G_1$, $G_2$, $G_T$ establishing a suitable k-linear assumption. Note that see Reference Literature 6 below for the definition of the k-linear assumption, for example.

REFERENCE LITERATURE 6

Allison B. Lewko and Brent Waters, "Efficient pseudo-random functions from the decisional linear assumption and weaker variants", Proceedings of the 2009 ACM Conference on Computer and Communications Security, CCS 2009, Chicago, Ill., USA, pp. 112-120, November 2009.

Reference Literature 6 above describes an example where a bilinear group establishing a k-linear assumption forms an elliptic curve, but a more-general method for forming such an elliptic curve is described in Reference Literature 7 below.

REFERENCE LITERATURE 7

David Freeman, Michael Scott and Edlyn Teske, "A taxonomy of" pairing-friendly elliptic curves, IACR Cryptology ePrint Archive, vol. 2006, pp. 372, http://eprint.iacr.org/2006/372, 2006.

Note that the above-described bilinear groups $G_1$, $G_2$, $G_T$ do not necessarily foim the elliptic curves. These bilinear groups $G_1$, $G_2$, $G_T$ may be formed by methods other than the elliptic curves.

Encryption in Examples

In Step S201 of FIG. 3, the encryption processing unit 201 inputs the master secret key msk, the public parameter pp, the index $i \in [\mu]$, and the vector $x \in Z^m$. Then, in Step S202 of FIG. 3, the encryption processing unit 201 generates the ciphertext $ct_i$ corresponding to the index i by the encryption algorithm Enc (msk, pp, i, x). At this time, in this example, the ciphertext $ct_i$ is generated as follows.

First, the encryption processing unit 201 assumes.

$$\tilde{x} := (x+u_i, 0^m, 1) \in Z_p \qquad \text{[Math. 29]}$$

and assumes $$s \xleftarrow{U} Z_p^k \qquad \text{[Math. 30]}$$

and obtains the following expression.

$$ct'_i := ([-V_i^T(A_i s, W_i A_i s + \tilde{x})]_1, [(A_i s, W_i A_i s + \tilde{x})]_1) \qquad \text{[Math. 31]}$$

The encryption processing unit 201 obtains as follows.

$$C_i := SKE.Enc(K, ct'_i) \qquad \text{[Math. 32]}$$

Then, the encryption processing unit 201 generates the ciphertext $ct_i$ corresponding to the index i according to $ct_i = (C_i, K_i)$.

Key Generation in Examples

In Step S301 of FIG. 4, the key generation processing unit 301 inputs the master secret key msk, the public parameter pp, and the vectors $\{y_i\}_{i \in [\mu]}$. Then, in Step S302 of FIG. 4, the key generation processing unit 301 generates the secret key sk by the key generation algorithm KeyGen (msk, pp, $\{y_i\}_{i \in [\mu]}$). At this time, in this example, the secret key sk is generated as follows.

First, the key generation processing unit 301 assumes.

$$\{r_i\}_{i \in [\mu-1]} \xleftarrow{U} Z_p \qquad \text{[Math. 33]}$$

$$r_\mu := -\left(\sum_{i \in [\mu-1]} r_i + \sum_{i \in [\mu]} \langle y_i, u_i \rangle\right) \in Z_p \qquad \text{[Math. 34]}$$

and obtain the following expression.

$$\hat{y}_i := (y_i, 0^m, r_i) \in Z_p \qquad \text{[Math. 35]}$$

The key generation processing unit 301 obtains the following expression.

$$r_1, \ldots, r_\mu \xleftarrow{U} Z_p^k \qquad \text{[Math. 36]}$$

Then, the key generation processing unit 301 assumes.

$$sk'_i := ([B_i r_i]_2, [V_i B_i r_i + (-W_i^T \hat{y}_i, \tilde{y}_i)]_2) \text{ for all } i \in [\mu] \qquad \text{[Math. 37]}$$

and generates the secret key sk according to the following expression $$sk := SKE.Enc(K, (sk'_1, \ldots, sk'_\mu)) \qquad \text{[Math. 38]}$$

Decryption in Examples

In Step S401 of FIG. 5, the decryption processing unit 401 inputs the public parameter pp, the ciphertext $\{y_i\}_{i \in [\mu]}$, and the secret key sk. Then, in Step S402 of FIG. 5, the decryption processing unit 401 generates the decrypted value d by the decryption algorithm Dec (pp, $\{y_i\}_{i \in [\mu]}$, sk). At this time, in this example, the decrypted value d is generated as follows.

First, the decryption processing unit 401 assumes.

$$K := \bigoplus_{i \in [\mu]} K_i \qquad \text{[Math. 39]}$$

and obtains $$\{sk'_i\}_{i \in [\mu]} := SKE.Dec(K, sk) \qquad \text{[Math. 40]}$$

and $$ct'_i := SKE.Dec(K, C_i).$$

Next, the decryption processing unit 401 obtains as follows.

$$d' := \prod_{i \in [\mu]} e(sk'_i, ct'_i) \qquad \text{[Math. 42]}$$

Furthermore, the decryption processing unit 401 generates, as the decrypted value d, the solution of a discrete logarithm problem of d' with e $(g_1, g_2)$ as a base.

Hardware Configuration

Finally, hardware configurations of the setup device 10, the encryption device 20, the key generation device 30, and the decryption device 40 included in the encryption system 1 in the embodiment of the present invention will be described.

Figure 6:
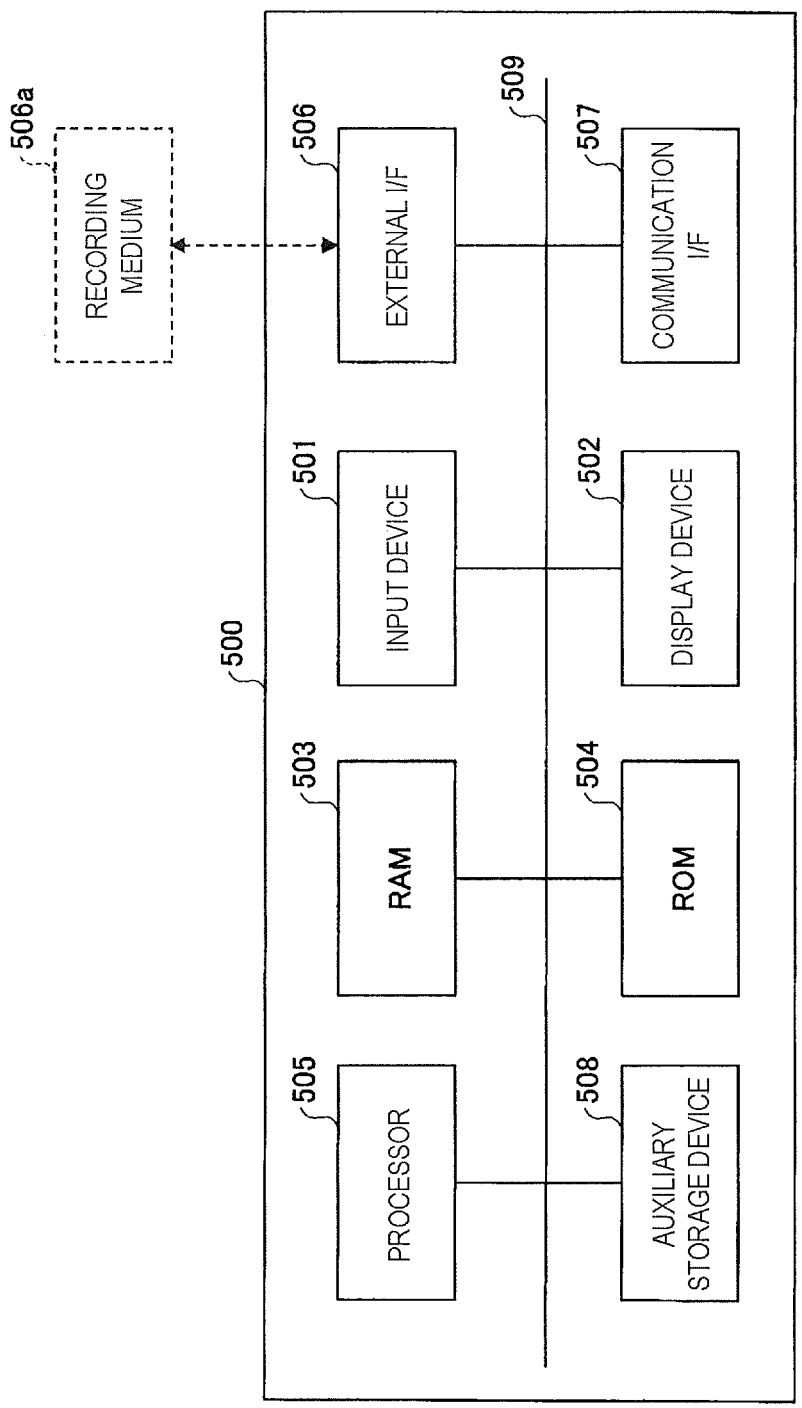
FIG. 6 is a diagram illustrating an example of a hardware configuration of a computer.

Hardware of these devices can be implemented using a computer 500 illustrated in FIG. 6, for example. FIG. 6 is a diagram illustrating an example of a hardware configuration of the computer 500.

As illustrated in FIG. 6, the computer 500 has an input device 501, a display device 502, a random access memory (RAM) 503, a read only memory (ROM) 504, a processor 505, an external I/F 506, a communication I/F 507, and an auxiliary storage device 508. These types of hardware are communicably connected to each other via a bus 509.

The input device 501 is, for example, a keyboard, a mouse, or a touch panel, and is used by a user to input various types of operation. The display device 502 is, for example, a display, and displays a processing result of the computer 500. Note that the computer 500 does not necessarily have at least one of the input device 501 or the display device 502.

The RAM 503 is a volatile semiconductor memory (a main storage device) configured to temporarily store a program and data. The ROM 504 is a non-volatile semiconductor memory capable of retaining a program and data even when the power is turned off. The ROM 504 stores, for example, configuration information related to an operating system (OS) and configuration information for connection to the communication network N.

The processor 505 is, for example, a central processing unit (CPU), and an arithmetic device configured to read a program and data from the ROM 504, the auxiliary storage device 508, and the like to the RAM 503 to execute processing.

The external I/F 506 is an interface with an external device. The external device includes a recording medium 506a and the like. The computer 500 can read and write data from/to the recording medium 506a via the external I/F 506, for example.

Examples of the recording medium 506a include a flexible disk, a compact disc (CD), a digital versatile disk (DVD), a secure digital memory card (a SD memory card), and a universal serial bus (USB) memory card.

The communication I/F 507 is an interface for connecting the computer 500 to the communication network N.

The auxiliary storage device 508 is, for example, a hard disk drive (HDD) or a solid state drive (SSD), and is a non-volatile storage device configured to store a program and data. Examples of the program and the data stored in the auxiliary storage device 508 include an OS, an application program implementing various functions on the OS, and a program implementing various types of processing in the embodiment of the present invention.

With the hardware configuration of the computer 500 illustrated in FIG. 6, the setup device 10, the encryption device 20, the key generation device 30, and the decryption device 40 in the embodiment of the present invention can implement various types of processing described above. Note that the computer 500 is not limited to the example illustrated in FIG. 6, and may have a plurality of arithmetic devices (the processor 506) and a plurality of memories (the RAM 503, the ROM 504, and the auxiliary storage device 50), for example.

CONCLUSION

As described above, in the encryption system 1 in the embodiment of the present invention, the function-hiding inner product functional encryption having the predetermined characteristics (i.e., the inner product can be calculated on the quotient ring $Z_n$) can be converted into the function-hiding multi-input inner product functional encryption in a versatile manner. Thus, according to the encryption system 1 in the embodiment of the present invention, it is only required that the function-hiding inner product functional encryption having the predetermined characteristics are safely designed, and the effort required for designing the function-hiding multi-input inner product functional encryption can be significantly reduced. Note that as described above, the common key encryption used in implementation of the function-hiding multi-input inner product functional encryption needs to satisfy the indistinguishability under the chosen-plaintext attack.

The present invention is not limited to the disclosure of above-described embodiment, and various modifications and alterations may be made without departing from the scope of the claims.

REFERENCE SIGNS LIST

1 Encryption system
10 Setup device
20 Encryption device
30 Key generation device
40 Decryption device
101 Setup processing unit
102 Storage unit
201 Encryption processing unit
202 Storage unit
301 Key generation processing unit
302 Storage unit
401 Decryption processing unit
402 Storage unit

The invention claimed is:

1. An encryption system for performing encryption and decryption by a multi-input inner product functional encryption having a function hiding property, the encryption system comprising:
a processor; and
a memory storing program instructions that cause the processor to:
generate, taking a vector length m and a number of arguments µ, of the inner product function as input, a master secret key msk and a public parameter pp by using
a setup algorithm of a single-input inner product functional encryption having a predetermined characteristic and having a function hiding property and
a key generation algorithm of a common key encryption satisfying a predetermined condition;
generate, taking the master secret key msk, the public parameter pp, an index i of the arguments, and a vector x as input, a ciphertext $ct_i$ corresponding to the index i by using an encryption algorithm of the single-input inner product functional encryption and an encryption algorithm of the common key encryption;
generate, taking the master secret key msk, the public parameter pp, and vectors $y_1, \ldots, y_\mu$ in which a number of the vectors is µ as input, a secret key sk for decrypting the ciphertext $ct_i$ by using a key generation algorithm of the single-input inner product functional encryption and the encryption algorithm of the common key encryption; and
generate, taking the public parameter pp, ciphertexts $ct_1, \ldots, ct_\mu$, and the secret key sk as input, a decrypted value d of the ciphertexts $ct_1, \ldots, ct_\mu$ by using a decryption algorithm of the single-input inner product functional encryption and a decryption algorithm of the common key encryption.

2. The encryption system according to claim 1, wherein the predetermined characteristic is that an inner product is able to be calculated on a quotient ring $Z_{n, \text{ and}}$
the predetermined condition is that indistinguishability under chosen-plaintext attack is satisfied.

3. An encryption device for performing encryption by a multi-input inner product functional encryption having a function hiding property, the encryption device comprising:
a processor; and
a memory storing program instructions that cause the processor to:
generate, taking a vector length m and a number of argumentsµ of an inner product function as input, a master secret key msk and a public parameter pp by using
a setup algorithm of a single-input inner product functional encryption having a predetermined characteristic and having a function hiding property and
a key generation algorithm of a common key encryption satisfying a predetermined condition; and
generate, taking the master secret key msk, the public parameter pp, an index i of the arguments, and a vector x as input, a ciphertext $ct_i$ corresponding to the index i by using an encryption algorithm of the single-input inner product functional encryption and an encryption algorithm of the common key encryption.

4. A decryption device for decrypting a ciphertexts $ct_1, \ldots, ct_\mu$ encrypted by a multi-input inner product functional encryption having a function hiding property, the decryption device comprising:

a processor; and memory storing program instructions that cause the processor to:

generate, taking a public parameter pp, the ciphertexts $ct_1, \ldots, ct_\mu$, and a certain secret key sk as input, a decrypted value d of the ciphertexts $ct_1, \ldots, ct_\mu$ by using a decryption algorithm of a single-input inner product functional encryption having a predetermined characteristic and having a function hiding property and a decryption algorithm of a common key encryption satisfying a predetermined condition.

5. A non-transitory computer-readable storage medium that stores therein a program comprising the program instructions for causing a computer to function as the encryption device according to claim 3.

6. A non-transitory computer-readable storage medium that stores therein a program comprising the program instructions for causing a computer to function as the decryption device according to claim 4.

* * * * *